Patented Nov. 10, 1936

2,060,303

UNITED STATES PATENT OFFICE 2,060,303

TREATMENT OF VINYL TYPE MONOHALIDES

Herbert P. A. Groll, Oakland, and George Hearne, Berkeley, Calif.

No Drawing. Application March 19, 1934, Serial No. 716,330

16 Claims. (Cl. 260—156)

This invention relates to a novel process for the treatment of vinyl type monohalides and is more particularly concerned with effecting the reaction of vinyl type monohalides with halogen and water, with aqueous solutions of halogen substantially devoid of undissolved halogen or with alkyl or aralkyl esters of hypohalogenous acids in the presence of water whereby halogenated carbonyl compounds and/or halogenated compounds with or without hydroxyl groups can be prepared.

By the term "vinyl type monohalide" as used in this specification, we mean those organic compounds which contain at least one

grouping regardless of the character of the organic compound in which such a grouping may be contained. The grouping may comprise part of an iso or normal alkyl chain which may or may not be attached to a cyclic radical as of the aromatic, alicyclic and heterocyclic series, or may comprise part of an alicyclic structure. The organic compound, irrespective of the vinyl type monohalide group or groups comprised therein, may or may not contain one or more halogen atoms. The term "vinylic carbon" atom is used to designate either of the unsaturated vicinal carbon atoms embraced in the structure

For example, the unsaturated carbon atom to which a halogen atom is attached may be termed a halogenated vinylic carbon atom.

In operating with vinyl type monohalides, one encounters various species which can be classified in several distinct groups for the purposes of the present invention. The main groups may be considered to embrace: (1) those vinyl type monohalides wherein neither of the vinylic carbon atoms is of tertiary character. This group possesses at least one

structure wherein the free bond of the halogenated vinylic carbon atom is taken up by hydrogen, an organic radical or other suitable monovalent substituent and at least one bond of the vicinal vinylic carbon atom is taken up by hydrogen; and (2) those vinyl type monohalides wherein a tertiary carbon atom constitutes one of the vinylic carbon atoms, thus

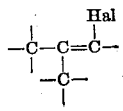

and (3) those vinyl type monohalides which contain a vinylic tertiary carbon atom which is once removed from a carbon atom directly attached to three or four carbon atoms, such as those possessing the groupings

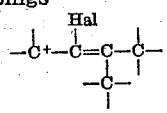

or

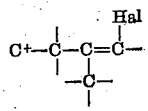

wherein C+ represents a quaternary or tertiary carbon atom which may be in an open chain or in a cyclic arrangement of alicyclic, aromatic or heterocyclic character.

In executing our invention with any of the above classified vinyl type monohalides, we proceed as follows: the selected subgroup of vinyl type monohalides is caused to react with halogen and water, an aqueous solution of halogen or an aqueous solution of hypohalogenous acid and hydrogen halide or with alkyl or aralkyl hypohalites in the presence of water. Where neither of the vicinal vinylic carbon atoms is of tertiary character, the main product is a halogenated carbonyl compound which may be aldehydic or ketonic depending on whether the halogenated vinylic carbon atom is attached, respectively, to hydrogen or to another carbon atom. Where a vinylic carbon atom is of tertiary character and not once removed from a quaternary or tertiary carbon atom, the main product is a polyhalohydrin due to the preferred addition of the hydroxyl group to the tertiary vinylic carbon atom. The product may also be regarded as a polyhalogenated tertiary alcohol. However, when one of the vinylic carbon atoms is of tertiary character and also once removed from a tertiary or quaternary carbon atom, the main product is a further halogenated compound, that is, the double bond is taken up by two halogen atoms, and in certain cases one or more hydrogen atoms in the molecule may be substituted by halogen. The vinyl type monohalide employed in our process may be reacted in the liquid or the gaseous state, depending on the physical state at the desired temperature and pressure of operation. In the case that the vinyl type monohalide is a gas under the desirable operating conditions, the process may be executed by contacting the vinyl type monohalide and halogen and water or equivalent reactants by any of the conventional methods, as by scrubbing, bubbling the gas through the reactant, violent agitation of the reactants, etc. It was found that excellent results are obtained when the aqueous solution of halogen or its equivalent is atomized into an atmosphere of the vinyl type monohalide to be treated. In the majority of cases, the reactants are contacted in the liquid phase. The liquid vinyl type monohalide and an aqueous solution of halogen or its equivalent are contacted in any suitable manner. For example, the solution may be injected into an excess of the vinyl type monohalide in the absence or presence of water, organic diluents or solvents for the vinyl monohalide and reaction product such as alcohols, ethers, esters, hydrocarbons, halogenated hydrocarbons etc., which solvent may be added for the purpose of effecting inversion of the two liquid phases in the reaction stage when the vinyl type monohalide and resulting product are lighter than water. In many cases, we prefer to use solutions of the vinyl type monohalide with carbon tetrachloride or higher saturated hydrocarbon chlorides. This mode of operation materially enhances the contacting of the reactants and aids in effecting separation of the vinyl type monohalide and reaction product from the aqueous liquid cycled. To facilitate the reaction, it may be desirable, especially in cases wherein the vinyl type monohalide is insoluble or immiscible with the aqueous solution of the other reactant, to insure intimate contact of the reactants as by agitation or efficient countercurrent contact. It is desirable, for the purpose of obviating undesirable side reactions, to operate with the vinyl type monohalide in excess of the halogenous acid or equivalent reactant in the reaction chamber.

The halogen may be dissolved in water prior to contact with the vinyl type monohalides or the halogen may be relatively slowly introduced into a mixture or solution of the vinyl type monohalide in water. The former method of operation is more desirable since by exercise of reasonable precautions the contact of free halogen with the vinyl type monohalide, which may lead to undesirable side reactions as the addition or substitution of halogen, is obviated. Where the halogen is employed in the gaseous state, its solution in water may be easily effected by bubbling or injecting the halogen into the agitated water or by effecting countercurrent contact of the halogen and water in a suitable scrubbing or absorbing device. The reactants may be introduced into a reaction vessel intermittently or continuously. For example, the vinyl type monohalide and solution of halogen in water may be simultaneously and continuously introduced into the reaction vessel wherein reaction is effected, the reaction product being continuously or intermittently withdrawn from the system. Alternatively, the reaction product may be left in solution or suspension with the unreacted vinyl type monohalide and the spent or partially spent aqueous solution of halogen intermittently or continuously withdrawn from the system and recontacted with halogen prior to reutilization in the reaction vessel.

When a halogen is dissolved in water a mobile equilibrium is established which may be represented by the reaction $$(Hal)_2 + H_2O \rightleftarrows Hal \cdot OH + H \cdot Hal$$

Consequently, when halogen is dissolved in the water and contacted with a vinyl type monohalide, the vinyl type monohalide reacts with the hypohalogenous acid existing in the solution and not with free halogen. We have observed, in the execution of our process that the vinyl type monohalide does not react with hydrogen halide existing in the solution and, moreover, its presence in concentrations up to about 1.5 N has no appreciable detrimental effect on the principal reaction or resulting products. Concentrations of hypohalogenous acid above the concentrations obtained in accordance with the equilibrium reaction of the halogen in aqueous solution were observed to be disadvantageous in that undesirable side reactions are favored, hence we prefer to utilize the depressing effect of the hydrogen halide which limits the solubility of the halogen and thereby the concentration of hypohalogenous acid. We prefer to operate with solutions of halogen in water wherein the product of the hypohalogenous acid and hydrogen halide concentrations is not greater than about 1.0, when expressed in terms of normal solutions, and wherein the hydrogen halide concentration does not exceed 1.5 normal. In a continuous process which comprises utilizing a recycled aqueous halogen solution, which may also contain reaction product and unreacted vinyl type monohalide, the predetermined concentration of hydrogen halide may be maintained by continuously or intermittently withdrawing a portion of the solution and replacing the withdrawn portion by an equivalent volume of water or halogen solution. In general, for reasons of economy, ease of operation and availability, we prefer to execute our process employing aqueous solutions of chlorine. Excellent results may also be obtained with an aqueous bromine solution.

When it is desired to effect the reaction of a vinyl type monohalide with an alkyl or aralkyl ester of a hypohalogenous acid, we may proceed as follows: the vinyl type monohalide and organic hypohalite may be brought together in the presence of water and intimate contact of the reactants effected by agitation. The order of introduction of the reactants may be varied to suit the particular taste of the operator.

The general reaction of an ester of a hypohalogenous acid and vinyl type monohalide in the presence of water may be illustrated by the following specific reaction of isocrotyl chloride and tertiary butyl hypochlorite, whereby the products formed are a tertiary butyl alcohol and a dichloro tertiary butyl alcohol.

$$CH_3-C=CHCl+(CH_3)_3COCl+H_2O$$
$$\quad\ \ |$$
$$\ \ CH_3$$

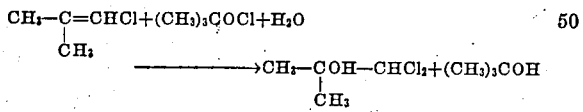

The primary secondary and tertiary alkyl and aralkyl esters of hypochlorous and hypobromous acids are the most suitable organic hypohalites adaptable to this mode of execution of our process. If desired, mixed organic hypohalites may be employed, in which case mixed alcohols are obtained as by-products. The alcohols formed during the reaction may be utilized in a mixture or solution with the reaction products for solvent purposes, or as intermediates, etc., or separation of the products may be accomplished by any of the conventional means such as selective extraction, distillation, stratification and the like. The recovered non-halogenated alcohols may, if desired, be utilized in the preparation of the corresponding hypohalogenous acid esters.

Our process may be executed at any desired temperature depending on the stability and character of the reactants employed. In the majority of cases, we prefer to operate at about room temperature. When the vinyl type monohalide and/or reaction product thereof is or are easily oxidized or otherwise undesirably affected, it is of advantage to operate at temperatures substantially below 20° C. Moderately elevated temperatures and shorter times of contact of the reactants may be employed when it is of advantage to accelerate the reaction, but we have observed that at higher temperatures undesirable side reactions are favored.

In the majority of cases, it is desirable to operate at atmospheric pressure, however, when warranted by the reactants, temperature and particular operating conditions chosen, subatmospheric or superatmospheric pressures may be advantageously employed.

The product, the nature of which is dependent on the type of vinyl type monohalide reacted, may be intermittently or continuously withdrawn from the reaction vessel in a mixture, solution or suspension with unreacted vinyl type monohalide, water, and/or other organic or inorganic bodies which may be present. The product may be recovered by any suitable method as by stratification, extraction, distillation and the like. The unreacted vinyl type monohalide recovered may be reutilized in a reaction stage.

The following examples are introduced for the purpose of illustrating the mode and conditions of operation of our process wherein certain specific reactants are employed.

Example I

The process was executed in a cyclic system consisting of a suitable reaction chamber, a separator stage for breaking up emulsions in the liquid leaving the reaction vessel and an absorption column wherein circulating water is saturated with chlorine and introduced into the reaction chamber.

The system was charged with about 5000 c. c. of water, 100 c. c. of carbon tetrachloride and 100 c. c. of 2-chlorobutene-2

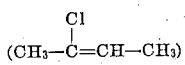

While the liquids were violently agitated in the reaction chamber and the water caused to circulate through the system, gaseous chlorine was continuously introduced into the lower portion of the countercurrent halogen absorption column at a rate of about 20 to 25 grams of chlorine per hour. 2-chlorobutene-2 was intermittently admitted to the reaction chamber at a rate of about 25 grams per hour. After about 8.5 hours of continuous operation a total of 5.16 mols of 2-chlorobutene-2 and 4.0 mols of chlorine had been introduced into the system. About 4.86 mols of hydrogen chloride were found in the circulating liquid at the end of the run; this represents a hydrogen chloride concentration of about 1.1 N. The liquid was withdrawn from the apparatus and extracted with ethyl ether. After removal of the ether by distillation, the product was fractionated. 85% of the product boiling at 116° C. to 117° C. was identified as chloro butanone having the probable formula

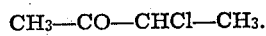

The remaining 15% of the product was identified as a dichloro secondary butyl alcohol having the probable formula

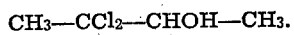

Example II

The apparatus used was cyclic and consisted of a spray chamber filled with gaseous vinyl type monohalide into which the aqueous solution of halogen was atomized, a halogen absorption tower wherein the halogen was countercurrently contacted with water and a circulating pump for cycling the liquid through the system.

About 6000 c. c. of water were introduced into the system and the spray chamber filled with gaseous vinyl chloride ($CH_2=CHCl$). The circulating pump was started and chlorine introduced into the countercurrent halogen absorbing column; the resulting solution of halogen in water was atomized into the spray chamber wherein it reacted with the vinyl chloride. Vinyl chloride was continuously introduced into the reaction chamber at such a rate that the pressure therein was maintained substantially constant. About 92 grams of chlorine and about 82 grams of vinyl chloride were introduced into the system during one hour of operation.

The aqueous solution containing the reaction product and hydrogen chloride was extracted with ether. The ether was removed by distillation and the product fractionated. Substantially all of the product distilled at from 84° C. to 86° C. and was identified as the hydrate of chloroacetaldehyde having the probable formula $CH_2Cl-CHO.\frac{1}{2}H_2O$. The yield of chloroacetaldehyde was about 90% of the theoretical.

Example III

The apparatus used was the same as that described in Example I.

The system was charged with 5000 c. c. of water, 100 c. c. of carbon tetrachloride and 100 c. c. of isocrotyl chloride

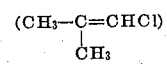

While the liquids were violently agitated in the reaction chamber and the aqueous solution caused to circulate through the system, chlorine gas was introduced into the halogen gas absorber at a rate of about 20 to 25 grams of chlorine per hour. Isocrotyl chloride was intermittently introduced into the reaction chamber at a rate of about 25 grams per hour. After about 18 hours of continuous operation, a total of about 405 grams of chlorine and 620 grams of isocrotyl chloride had been introduced into the system. A portion of the circulating aqueous solution was then withdrawn from the cycle and its hydrochloric acid content determined. The hydrogen chloride concentration was about 4% or 1.12 N. The operation was continued in the manner described for an additional 13 hours, but during this time water was continuously introduced into the system at a rate of about 250 to 300 grams per hour for the purpose of keeping the hydrogen chloride concentration of the circulating liquid at or below about 4%. Portions of the liquid were withdrawn from the system whenever necessary to maintain the volume of liquid in the system substantially constant. The operation was terminated after about 32 hours during which time a total of 1000 grams of isocrotyl chloride and about 780 grams of chlorine had been introduced into the system.

The liquid contents were removed from the apparatus and permitted to stratify into two phases. The aqueous phase was extracted with ether and the ether solution combined with the previously separated other phase. The resulting mixture of ether, carbon tetrachloride and reaction product was dried and fractionated.

After the ether and carbon tetrachloride were removed, the product was distilled at 150.5° C. under atmospheric pressure. About 1200 grams of product identified as a dichloro tertiary butyl alcohol having the probable formula

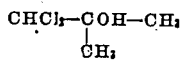

were obtained.

Example IV

The apparatus used was the same as that described in Example I.

The procedure and mode of operation was essentially the same as described in Examples I and III.

In the course of about 8.5 hours of continuous operation, about 5.2 mols of phenyl isocrotyl chloride

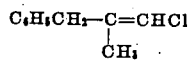

were reacted with about 4 mols of chlorine in aqueous solution.

After subsequent extraction, fractionation and identification, it was found that the products were the 2,3,3-trichloro-2 methyl-1 phenyl-propane, and 3-chloro-2 (chloro methyl)-1-phenyl-propene-3.

Example V 200 grams of isocrotyl chloride, 1.5 liters of water and 217 grams of tertiary butyl hypochlorite were introduced into a flask and rapidly stirred at room temperature and atmospheric pressure for one hour. At the end of this time the liquid mass was removed and extracted with ethyl ether. The ether solution was distilled at atmospheric pressure. The main reaction products were tertiary butyl alcohol and a dichloro tertiary butyl alcohol of the formula

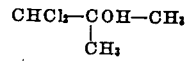

boiling at 150.5° C. under atmospheric pressure. The product was obtained in a yield of about 90%.

Example VI 200 grams of 1,3-dibromo propene-1 of the formula CHBr=CH—CH₂Br and 1000 grams of water were put in a flask and 160 grams of bromine slowly added to the violently agitated mixture. The reacted mixture was fractionated. The product obtained was 1,2-dibromo propanol-3 of the formula CH₂Br—CHBr—CHO. The product was obtained in a yield of about 75%.

In certain cases where vinyl type monohalides are obtained in mixtures or solutions comprising more than one species or type of vinyl type monohalide, such a mixture or solution may be utilized without resorting to separation of the constituents. The reaction products may be utilized for solvent and like purposes, or as intermediates in the preparation of other organic compounds.

The products obtained in the execution of our process may be utilized as solvents and extractants in numerous extraction, purification, refining and recovery processes, such as for refining of mineral oils, purification or refinery and manufactured gases, etc. The carbonylic halogen compounds are adaptable to utilization in the manufacture of resins, condensation products and the like. The polyhalogenated tertiary alcohols may be hydrolized and polyhydric alcohols obtained, or they may be used as basic materials for the production of the corresponding oxides, epihalohydrins, ethers, esters, etc. The compounds may be used as dehydrating agents with aqueous organic solutions, as material for the preparation of esters, ethers, etc.

While we have in the foregoing described in some detail the preferred embodiment of our invention and some variants thereof, it will be understood that this is only for the purpose of making the invention more clear and that the invention is not to be regarded as limited to the details of operation, nor is it dependent on the soundness or accuracy of the reasons advanced for the advantageous results obtained. On the other hand, the invention is to be regarded as limited only by the terms of the accompanying claims, in which it is our intention to claim all novelty inherent therein as broadly as possible in view of the prior art.

We claim as our invention:

1. A process for the treatment of vinyl type monohalides which comprises effecting the reaction of a vinyl type monohalide wherein the nonhalogenated vinylic carbon atom is tertiary, with a halogen in the presence of water.

2. A process for the treatment of vinyl type monohalides which comprises effecting the reaction of a vinyl type monohalide wherein the nonhalogenated vinylic carbon atom is tertiary, with an aqueous solution of a halogen in the substantial absence of undissolved halogen.

3. A process for the production of 3-chlorobutanone-2 which comprises effecting the reaction of 2-chlorobutene-2 with an aqueous solution of chlorine in the substantial absence of undissolved chlorine.

4. A process for the production of 1,1-dichloro-2 methyl propanol-2 which comprises effecting the reaction of isocrotyl chloride with an aqueous solution of chlorine in the substantial absence of undissolved chlorine.

5. A process for the treatment of vinyl type monohalides which comprises reacting a vinyl type monohalide containing at least four carbon atoms to the molecule with a preformed reactant of the class consisting of an aqueous solution of a halogen, an aqueous solution containing a hypohalogenous acid and a hydrogen halide, and an aqueous mixture of an organic hypohalite containing an alkyl group contiguous to the hypohalite radical.

6. A process for the treatment of vinyl type monohalides which comprises reacting a vinyl type monohalide wherein the non-halogenated vinylic carbon atom is tertiary with a reactant of the class consisting of an aqueous solution of a halogen, an aqueous solution containing a hypohalogenous acid and a hydrogen halide, and an aqueous mixture of an organic hypohalite containing an alkyl group contiguous to the hypohalite radical.

7. A process for the treatment of vinyl type monohalides which comprises reacting a vinyl type halide containing at least four carbon atoms to the molecule with a preformed aqueous solution containing a hypohalogenous acid and a hydrogen halide in the substantial absence of undissolved halogen.

8. A process for the treatment of vinyl type monohalides which comprises reacting a vinyl type monohalide containing at least four carbon atoms to the molecule with an organic hypohalite containing an alkyl group contiguous to the hypohalite radical in the presence of water.

9. A process for the treatment of vinyl type monohalides which comprises reacting a vinyl type monohalide containing at least four carbon atoms to the molecule with a halogen and water in the substantial absence of undissolved halogen.

10. A process for the treatment of vinyl type monohalides which comprises reacting a vinyl type monohalide wherein the non-halogenated vinylic carbon atom is tertiary with an aqueous solution of a hypohalogenous acid and a hydrogen halide.

11. A process for the treatment of vinyl type monohalides which comprises reacting a vinyl monohalide containing at least four carbon atoms to the molecule, with a compound of the general formula R—O—Hal, wherein R represents a hydrogen atom or a hydrocarbon radical linked to the oxygen atom by a carbon atom of an alkyl radical and Hal represents a halogen atom, in the presence of water and in the substantial absence of undissolved halogen, a hydrogen halide being present when a hypohalogenous acid is present and the product of the hypohalogenous acid and hydrogen halide concentration does not exceed 1 expressed in terms of normal solution throughout the reaction.

12. A process for the treatment of vinyl type monohalides which comprises reacting a vinyl type monohalide containing at least four carbon atoms to the molecule with an alkyl hypohalite in the presence of water.

13. A process for the treatment of vinyl type monohalides which comprises reacting a vinyl type monohalide containing at least four carbon atoms to the molecule with a tertiary alkyl hypochlorite in the presence of water.

14. A process for the treatment of vinyl type monohalides which comprises reacting a vinyl type monohalide which contains at least four carbon atoms and has the general formula

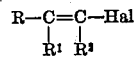

wherein R represents an alkyl radical and $R^1$ and $R^2$ represent hydrogen atoms or alkyl radicals, $R^2$ representing an alkyl radical when $R^1$ represents a hydrogen atom, with a preformed reactant of the class consisting of an aqueous solution of a halogen, an aqueous solution of a hypohalogenous acid and a hydrogen halide, and an aqueous mixture of an organic hypohalite containing an alkyl group contiguous to the hypohalite radical.

15. A process for the treatment of vinyl type monohalides which comprises reacting a vinyl type monohalide containing at least four carbon atoms to the molecule two of which are unsaturated and of secondary character with a preformed reactant of the class consisting of an aqueous solution of a halogen, an aqueous solution of a hypohalogenous acid and a hydrogen halide, and an aqueous mixture of an organic hypohalite containing an alkyl group contiguous to the hypohalite radical.

16. A process for the treatment of vinyl type monohalides which comprises reacting a vinyl type monohalide containing at least four carbon atoms to the molecule two of which are unsaturated and of secondary character with an aqueous solution of a halogen in the substantial absence of undissolved halogen.

HERBERT P. A. GROLL.
GEORGE HEARNE.